United States Patent
Tamatani et al.

(10) Patent No.: US 10,694,194 B2
(45) Date of Patent: Jun. 23, 2020

(54) IMAGE PROCESSING APPARATUS, NON-TRANSITORY COMPUTER READABLE STORAGE MEDIUM, AND IMAGE PROCESSING METHOD

(71) Applicant: FUJI XEROX CO., LTD., Tokyo (JP)

(72) Inventors: Mitsuyuki Tamatani, Kanagawa (JP); Kazuo Yamada, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 85 days.

(21) Appl. No.: 15/456,910

(22) Filed: Mar. 13, 2017

(65) Prior Publication Data

US 2018/0084259 A1    Mar. 22, 2018

(30) Foreign Application Priority Data

Sep. 21, 2016  (JP) .................. 2016-183633

(51) Int. Cl.
| | |
|---|---|
| *H04N 19/176* | (2014.01) |
| *H04N 19/93* | (2014.01) |
| *H04N 19/91* | (2014.01) |
| *H04N 19/182* | (2014.01) |
| *H04N 19/186* | (2014.01) |

(52) U.S. Cl.
CPC ......... *H04N 19/176* (2014.11); *H04N 19/182* (2014.11); *H04N 19/186* (2014.11); *H04N 19/91* (2014.11); *H04N 19/93* (2014.11)

(58) Field of Classification Search
CPC ...... H04N 19/176; H04N 19/93; H04N 19/91; H04N 19/182; H04N 19/186; H04N 19/124; H04N 19/85; H04N 19/94
See application file for complete search history.

(56) References Cited

U.S. PATENT DOCUMENTS

| | | | | |
|---|---|---|---|---|
| 6,301,389 | B1 * | 10/2001 | Penna | G06T 9/005 |
| | | | | 382/232 |
| 2007/0188356 | A1 * | 8/2007 | Yokose | G06T 9/004 |
| | | | | 341/51 |
| 2017/0374372 | A1 * | 12/2017 | Liu | H04N 19/59 |

FOREIGN PATENT DOCUMENTS

JP    2007-214997 A    8/2007

\* cited by examiner

*Primary Examiner* — Menatoallah Youssef
(74) *Attorney, Agent, or Firm* — Sughrue Mion, PLLC

(57) ABSTRACT

An image processing apparatus includes an image processing block configured to encode each of plural data strings by using the number of common run lengths which are common to the plural data strings as run information of identical pixel values which are consecutive in each of the plural data strings.

9 Claims, 10 Drawing Sheets

IMAGE PROCESSING APPARATUS, NON-TRANSITORY COMPUTER READABLE STORAGE MEDIUM, AND IMAGE PROCESSING METHOD

CROSS-REFERENCE TO RELATED APPLICATIONS

This application is based on and claims priority under 35 USC 119 from Japanese Patent Application No. 2016-183633 filed Sep. 21, 2016.

BACKGROUND

Technical Field

The present invention relates to an image processing apparatus, a non-transitory computer readable storage medium, and an image processing method.

SUMMARY

According to an aspect of the invention, an image processing apparatus includes an image processing block configured to encode each of plural data strings by using the number of common run lengths which are common to the plural data strings as run information of identical pixel values which are consecutive in each of the plural data strings.

BRIEF DESCRIPTION OF THE DRAWINGS

Exemplary embodiments of the present invention will be described in detail based on the following figures, wherein.

DETAILED DESCRIPTION

Figure 1:
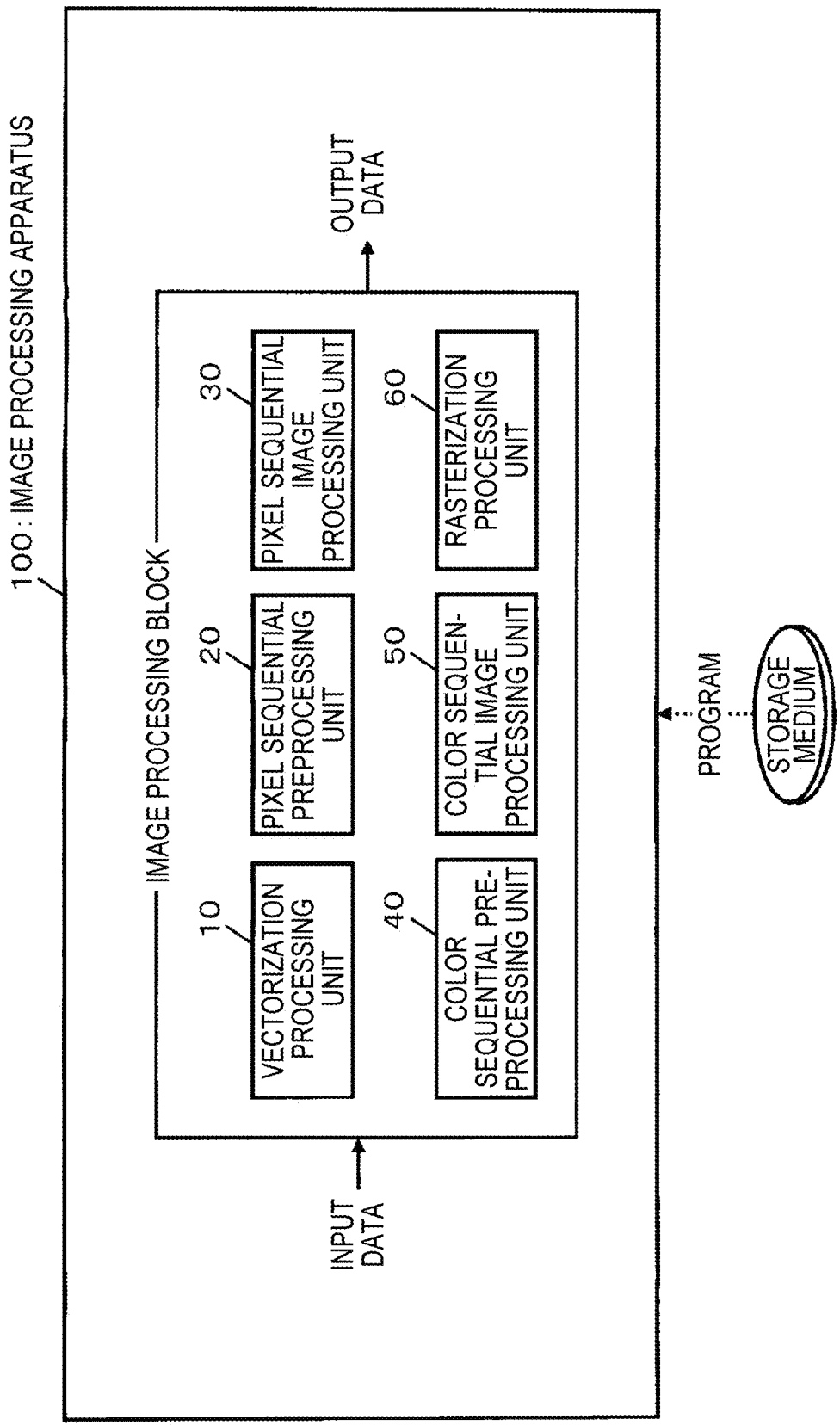
FIG. 1 is a view illustrating a specific example of an image processing apparatus according to an exemplary embodiment of the present invention.

FIG. 1 is a view illustrating a specific example of an image processing apparatus according to an exemplary embodiment of the present invention. The image processing apparatus 100 in FIG. 1 includes an image processing block and executes image processing on image data (including data of only letters, numerals and symbols).

The image processing block illustrated in FIG. 1 is configured with a vectorization processing unit 10, a pixel sequential preprocessing unit 20, a pixel sequential image processing unit 30, a color sequential preprocessing unit 40, a color sequential image processing unit 50 and a rasterization processing unit 60. The image processing block executes various processes on input data (image data) and outputs the processed image data as output data. A specific example of processing executed by each unit in the image processing block will be described in detail later.

The internal configuration (each unit denoted by a reference numeral) of the image processing block may be implemented by using various kinds of hardware. At least a portion in the image processing block is implemented by using, e.g., a dynamic reconfigurable processor (DRP) or the like. Further, at least a portion in the image processing block may be implemented by using, e.g., a programmable logic device (PLD), a field programmable gate array (FPGA), an application specific integrated circuit (ASIC) or the like.

It is to be noted that the above-described hardware for realizing the internal configuration of the image processing block is merely an example and other hardware may be used.

For example, at least a portion in the image processing block may be implemented by cooperation of hardware such as a CPU, a memory and the like and a program defining their operations, that is, by a computer. In a case where the functions in the image processing block are implemented by a computer, a program corresponding to the processing of each unit in the image processing block, which will be described in detail later, is stored in a computer-readable storage medium such as, for example, a disk or a memory and is provided to the computer via the storage medium. Of course, the program may be provided to the computer via an electric communication line such as the Internet. Then, the functions of the image processing block are implemented by cooperation of hardware resources, such as a CPU, a memory and the like provided in the computer, and the provided program (software).

In addition to the image processing block illustrated in FIG. 1, the image processing apparatus 100 also includes, for example, an image reading function (scanning function) and the like, and takes image data, which is obtained from a medium such as paper through the image reading function, as a processing target. Further, an image corresponding to image data subjected to the image processing by the image processing apparatus 100 may be printed on a medium such as paper, or the processed image data may be provided to an external apparatus. A suitable specific example of the image processing apparatus 100 includes a copier, a printer, a facsimile (FAX), and the like. A multifunction machine having plural functions of the copier, the printer and the facsimile is also a suitable specific example of the image processing apparatus 100. Of course, the image processing apparatus 100 may perform image processing on image data obtained from an external apparatus such as, for example, a computer.

The overall configuration of the image processing apparatus 100 in FIG. 1 is as described above. Next, a specific example of processes and functions implemented by the image processing apparatus 100 will be described. In the following description, reference numerals in FIG. 1 are used for the configurations (units denoted by reference numerals) illustrated in FIG. 1.

The image processing apparatus 100 has a function of executing color sequential image processing and pixel sequential image processing on image data. Therefore, specific examples of the color sequential image processing and the pixel sequential image processing will first be described.

Figure 2:
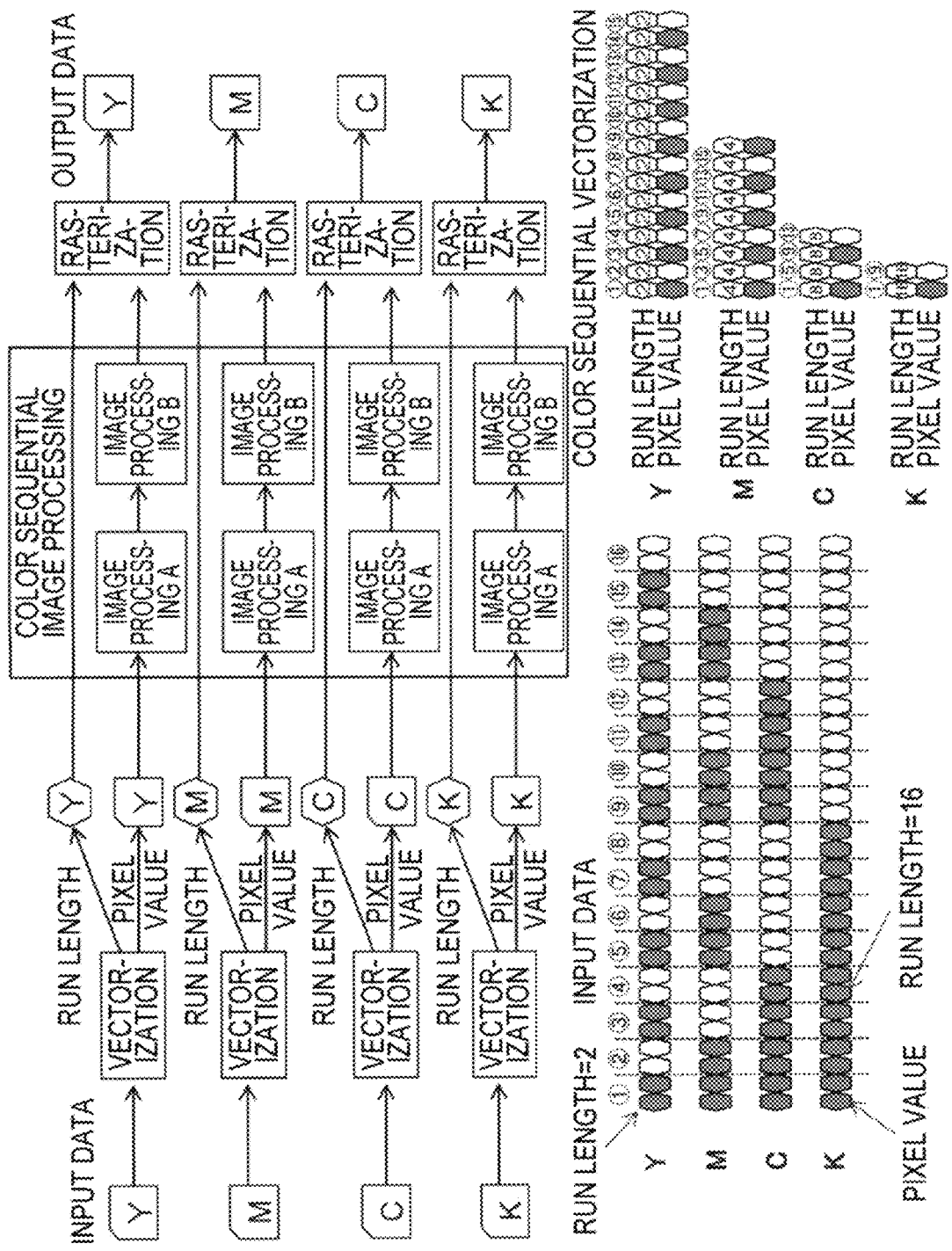
FIG. 2 is a view for explaining a specific example of color sequential image processing.

FIG. 2 is a view for explaining a specific example of the color sequential image processing. FIG. 2 illustrates a specific example of the color sequential image processing for four input data (data strings) corresponding respectively to four color components of YMCK. In this example, the four color components are Y (yellow), M (magenta), C (cyan) and K (black), respectively.

In the color sequential image processing, it is possible to obtain an image processing result for input data of each color component without being affected by input data of other color components. For example, regardless of data values (pixel values) of the MCK components, an image processing result of the Y component may be obtained according to a data value (pixel value) of the Y component.

Therefore, as vectorization for the color sequential image processing, color sequential vectorization (vectorization for area-sequence) for each color component, which is not affected by other components, becomes possible. In the specific example of FIG. 2, color sequential vectorization is performed before color sequential image processing.

In the color sequential vectorization, for example, as in the specific example illustrated in FIG. 2, a run length which is the number of consecutive identical pixel values is determined for each of color components of YMCK, and the input data (data string) of each color component is encoded into a vector format based on a combination of a pixel value and the run length.

Figure 3:
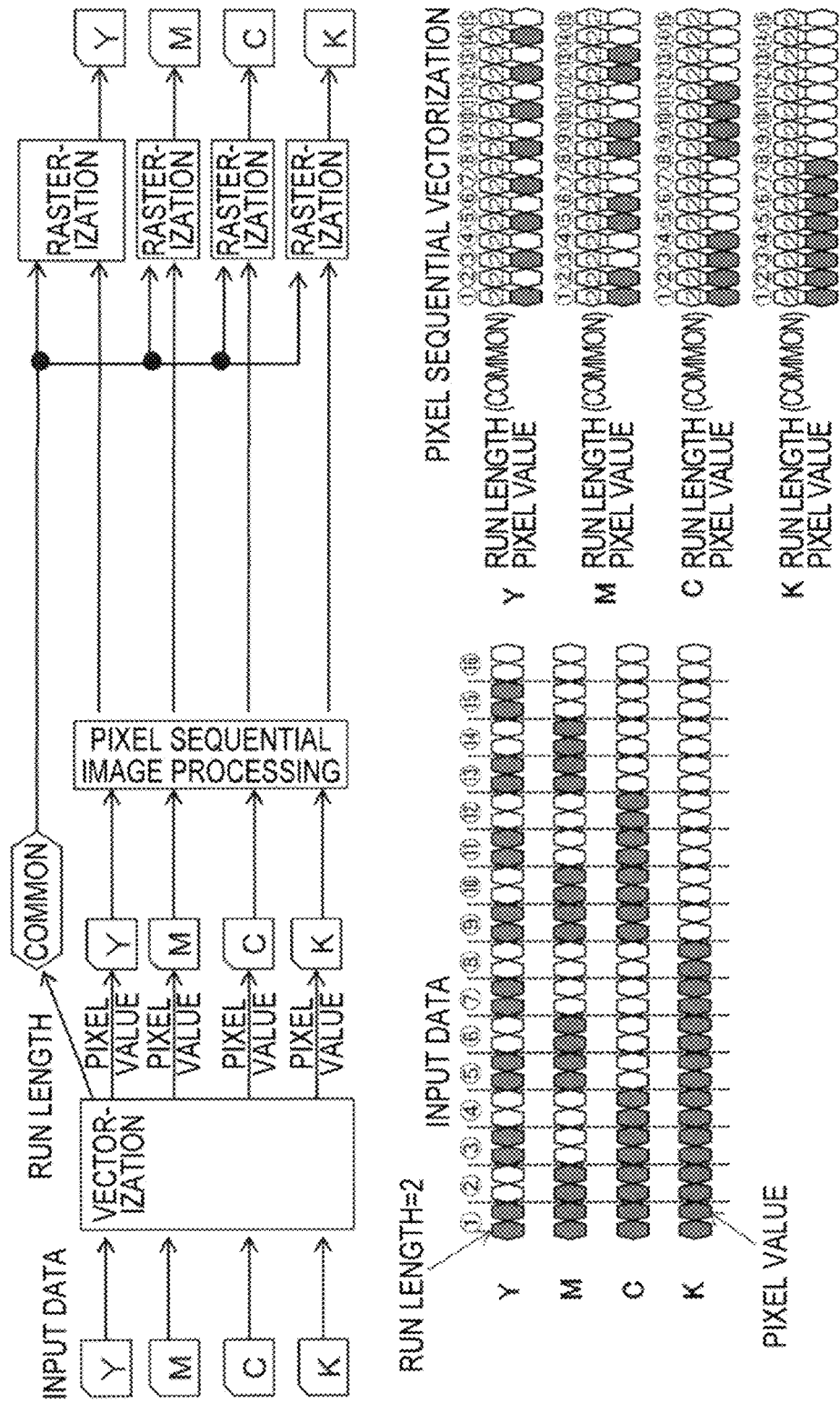
FIG. 3 is a view for explaining a specific example of pixel sequential image processing.

The color sequential vectorization has a vectorization ratio (compression ratio) higher than that of pixel sequential vectorization illustrated in FIG. 3. Therefore, in the color sequential image processing, the image processing time is shorter in the color sequential vectorization than in the pixel sequential vectorization. However, it is not possible to directly apply the color sequential vectorization to the pixel sequential image processing illustrated in FIG. 3 and the pixel sequential image processing needs the pixel sequential vectorization.

FIG. 3 is a view for explaining a specific example of the pixel sequential image processing. FIG. 3 illustrates a specific example of the pixel sequential image processing for the identical input data as in FIG. 2, that is, four input data (data strings) corresponding respectively to four color components of YMCK.

In the pixel sequential image processing, in order to obtain an image processing result for input data of each color component, input data of other color components are required. For example, in order to obtain a pixel sequential image processing result on a data value (pixel value) of the Y component, data values (pixel values) of the MCK components corresponding to the identical pixel position as the data value (pixel value) of the Y component are required.

Therefore, as vectorization for the pixel sequential image processing, pixel sequential vectorization (vectorization for point-sequence) is performed to allow the data values (pixel values) of the four color components (YMCK) corresponding to the identical pixel position to be processed at the identical timing. In the specific example of FIG. 3, the pixel sequential vectorization is performed before the pixel sequential image processing.

In the pixel sequential vectorization, for example, as in the specific example illustrated in FIG. 3, a run length of each color component is determined so that run lengths of the four color components corresponding to the identical pixel position becomes equal to each other, and the input data (data string) of each color component is encoded into a vector format based on a combination of a pixel value and the run length.

The pixel sequential vectorization may be applied to both the pixel sequential image processing and the color sequential image processing. However, the pixel sequential vectorization has a vectorization ratio (compression ratio) lower than that of the color sequential vectorization illustrated in FIG. 2. Therefore, in the color sequential image processing, image processing time of the color sequential vectorization is shorter than that of the pixel sequential vectorization.

Figure 4:
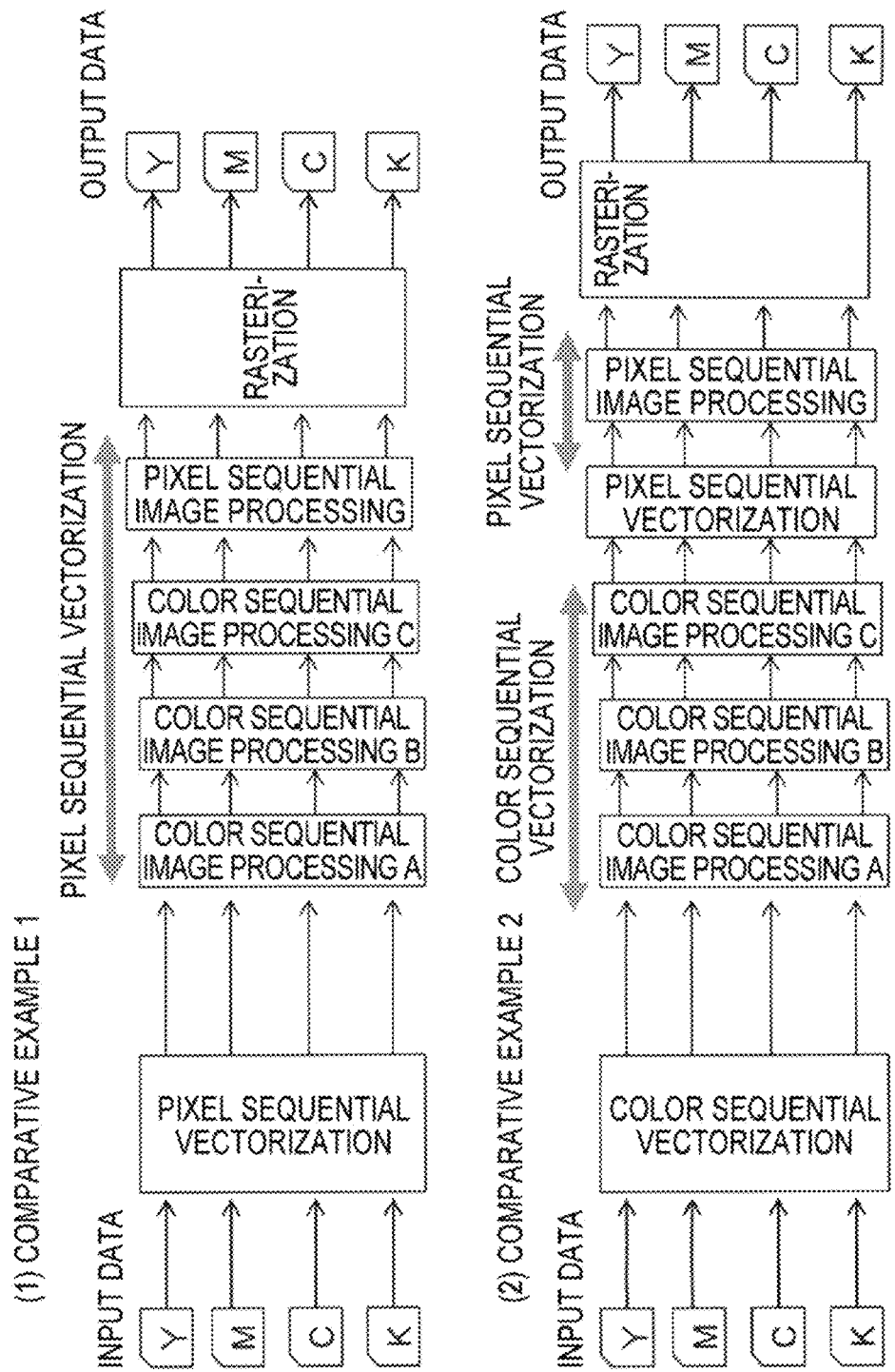
FIG. 4 is a view illustrating comparative examples of image processing in which color sequential image processing and pixel sequential image processing coexist.

FIG. 4 is a view illustrating comparative examples of image processing in which the color sequential image processing and the pixel sequential image processing coexist. FIG. 4 illustrates a specific example in which, after the color sequential image processing (A to C) is executed on the four input data (data strings) corresponding to the four color components of YMCK, the pixel sequential image processing is executed to obtain four output data (data strings) corresponding respectively to the four color components of YMCK.

A comparative example 1 first vectorizes four input data of YMCK in the pixel sequential manner, executes the color sequential image processing (A to C) and the pixel sequential image processing for the four input data subjected to the pixel sequential vectorization, rasterizes the four input data subjected to the image processing and outputs the rasterized data as four output data of YMCK.

A comparative example 2, first, vectorizes four input data of YMCK in a color sequential manner, executes the color sequential image processing (A to C) for the four input data which are vectorized in the color sequential manner. Then, the four input data subjected to the color sequential image processing are vectorized in the pixel sequential manner, the pixel sequential image processing is executed on the four input data subjected to the pixel sequential vectorization, and the four input data subjected to the image processing are rasterized and output as four output data of YMCK.

When an attention is paid to the vectorization processing, the vectorization processing is only pixel sequential vectorization in the comparative example 1, whereas two vectorization processes of the color sequential vectorization and the pixel sequential vectorization are performed in the comparative example 2. Therefore, the circuit size of the vectorization process may be smaller in the comparative example 1 than in the comparative example 2.

When an attention is paid to the color sequential image processing, the comparative example 1 executes the color sequential image processing for the data which are vectorized in the pixel sequential manner, whereas the comparative example 2 executes the color sequential image processing for the data vectorized in the color sequential manner. Therefore, the processing time of the color sequential image processing is shorter in the comparative example 2 than in the comparative example 1.

As explained with reference to FIGS. 2 and 3, each of the color sequential vectorization and the pixel sequential vectorization has its advantages and disadvantages. In addition, as explained with reference to FIG. 4, in a case where both the color sequential image processing and the pixel sequential image processing coexist, the order of the color sequential vectorization and the pixel sequential vectorization has an effect on the circuit size and the image processing performance. Therefore, the image processing apparatus 100 of FIG. 1 implements novel vectorization (encoding) as described below.

Figure 5:
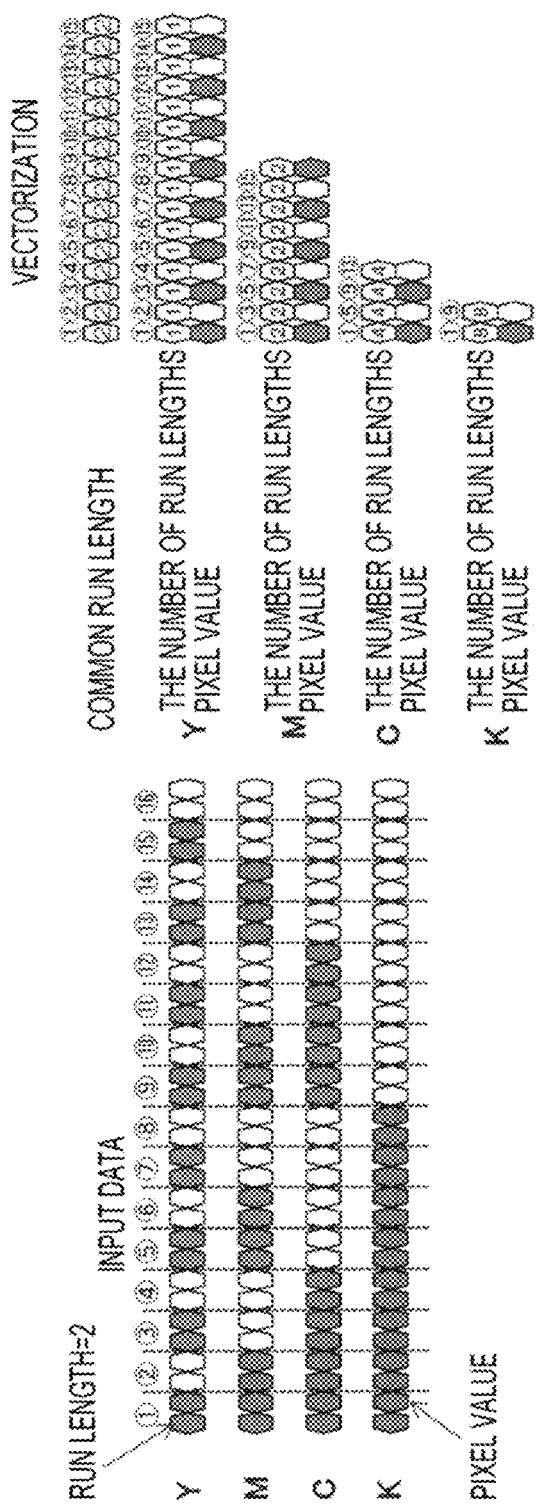
FIG. 5 is a view for explaining a vectorization process by the image processing apparatus of FIG. 1.

FIG. 5 is a view for explaining a vectorization process by the image processing apparatus 100 in FIG. 1. The image processing apparatus 100 includes an image processing block that encodes (vectorizes) each of plural data strings by using the number of common run lengths which are common to the plural data strings as run information of identical pixel values which are consecutive in each of the plural data strings. FIG. 5 illustrates a specific example of the vectorization process executed by the vectorization processing unit 10 of the image processing apparatus 100.

The vectorization processing unit 10 sets, as the common run length, the consecutive number of identical pixel values which are consecutive in each of the plural data strings, the consecutive numbers being defined so that the consecutive numbers in the plural data strings are equal to each other. Then, the vectorization processing unit 10 encodes each of the plural data strings into the vector format based on a combination of a pixel value and the number of run lengths, by using the number of run lengths which is the number of common run lengths.

FIG. 5 illustrates a specific example of the vectorization process by the vectorization processing unit 10 for four input data (data strings) corresponding respectively to four color components of YMCK. In the specific example illustrated in FIG. 5, a data string of the Y component includes pixel values of run length of 2, a data string of the M component includes pixel values of run length of 4, a data string of the C component includes pixel values of run length of 8, and a data string of the K component includes pixel values of run length of 16.

In the specific example of FIG. 5, the consecutive number (run length) by which the four data strings of YMCK are delimited at equal intervals is the run length of 2 which is the smallest common divisor of run length of 2, run length of 4, run length of 8 and run length of 16. Therefore, in the specific example of FIG. 5, the run length of 2 is set as the common run length.

Then, each data string of YMCK is encoded into the vector format based on a combination of a pixel value and the number of run lengths by using the number of common run lengths. For example, the data string (input data) of the Y component includes pixel values of run length of 2, and the run length of 2 is equivalent to one common run length (run length of 2). Therefore, the Y component data string is encoded into a vector format based on a combination of a pixel value and the number of run lengths of 1.

In addition, for example, the data string (input data) of the M component includes pixel values of run length of 4, and the run length of 4 and is equivalent to two common run lengths (run lengths of 2). Therefore, the M component data string is encoded into a vector format based on a combination of a pixel value and the number of run lengths of 2. In addition, the data strings (input data) of the C and K components include pixel values of run length of 8 and a pixel values of run length of 16, respectively and are equivalent to four common run lengths (run lengths of 2) and eight common run lengths (run lengths of 2), respectively. Therefore, the data strings of the C and K components are encoded into a vector format based on the number of run lengths of 4 and a vector format based on the number of run lengths of 8, respectively.

Figure 6:
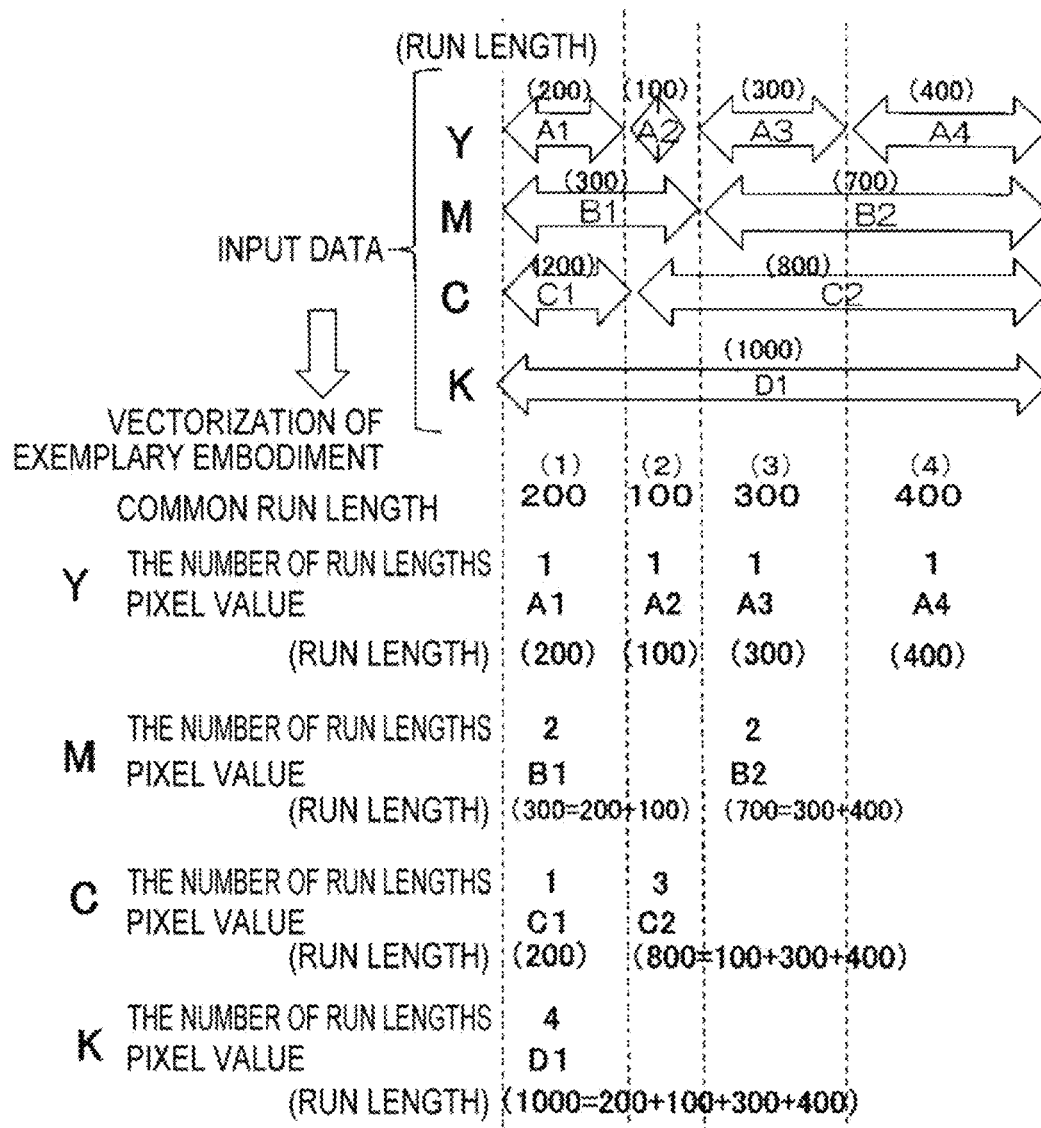
FIG. 6 is a view for explaining a vectorization process in a case where a run length is changed in each data string.

FIG. 6 is a view for explaining a vectorization process in a case where a run length is changed in each data string. In the specific example illustrated in FIG. 6, the run length of the Y component data string (input data) is changed to 200, 100, 300 and 400, the run length of the M component data string (input data) is changed to 300 and 700, and the run length of the C component data string (input data) is changed to 200 and 800. The run length of the K component data string (input data) is 1000.

Therefore, in the specific example of FIG. 6, the vectorization processing unit 10 sets the run length of the first common run length (1) as 200, the run length of the second common run length (2) as 100, the run length of the third common run length (3) as 300, and the run length of the fourth common run length (4) as 400 according to a change of a run length in each data string, and changes the common run lengths.

Then, since the run length of the pixel value A1 of the Y component is 200, which is equal to one common run length (1), the number of run lengths of 1 is associated with the pixel value A1. In addition, since the run length of the pixel value A2 of the Y component is 100, which is equal to one common run length (2), the number of run lengths of 1 is associated with the pixel value A2. Similarly, since the run length of the pixel value A3 of the Y component is equal to one common run length (3), the number of run lengths of 1 is associated with the pixel value A3. Since the run length of the pixel value A4 of the Y component is one common run length (4), the number of run lengths of 1 is associated with the pixel value A4.

The run length of the pixel value B1 of the M component is 300, which is equal to the common run length (1) having the run length of 200 plus the common run lengths (2) having the run length of 100. Therefore, the number of run lengths of 2 is associated with the pixel value B1. Further, since the run length of the pixel value B2 of the M component is 700 and is equal to the common run length (3) which is the run length of 300 plus the common run length (4) of the run length of 400, the number of run lengths of 2 is associated with the pixel value B2.

The run length of the pixel value C1 of the C component is 200, which is equal to one common run length (1) of the run length of 200. Therefore, the number of run lengths of 1 is associated with the pixel value C1. The run length of the pixel value C2 of the C component is 800, which is equal to the sum of the common run length (2) of the run length of 100, the common run length (3) of the run length of 300 and the common run length (4) of the run length of 400. Therefore, the number of run lengths of 3 is associated with the pixel value C2.

The run length of the pixel value D1 of the K component is 1000, which is equal to the sum of the common run length (1) of the run length of 200, the common run length (2) of the run length of 100, the common run length (3) of the run length of 300 and the common run length (4) of the run length of 400. Therefore, the number of run lengths of 4 is associated with the pixel value D1.

As in the specific example illustrated in FIG. 6, when the run length is changed in each data string, the vectorization processing unit 10 changes the common run length as necessary to implement encoding into a vector format based on a combination of a pixel value and the number of run lengths.

Figure 7:
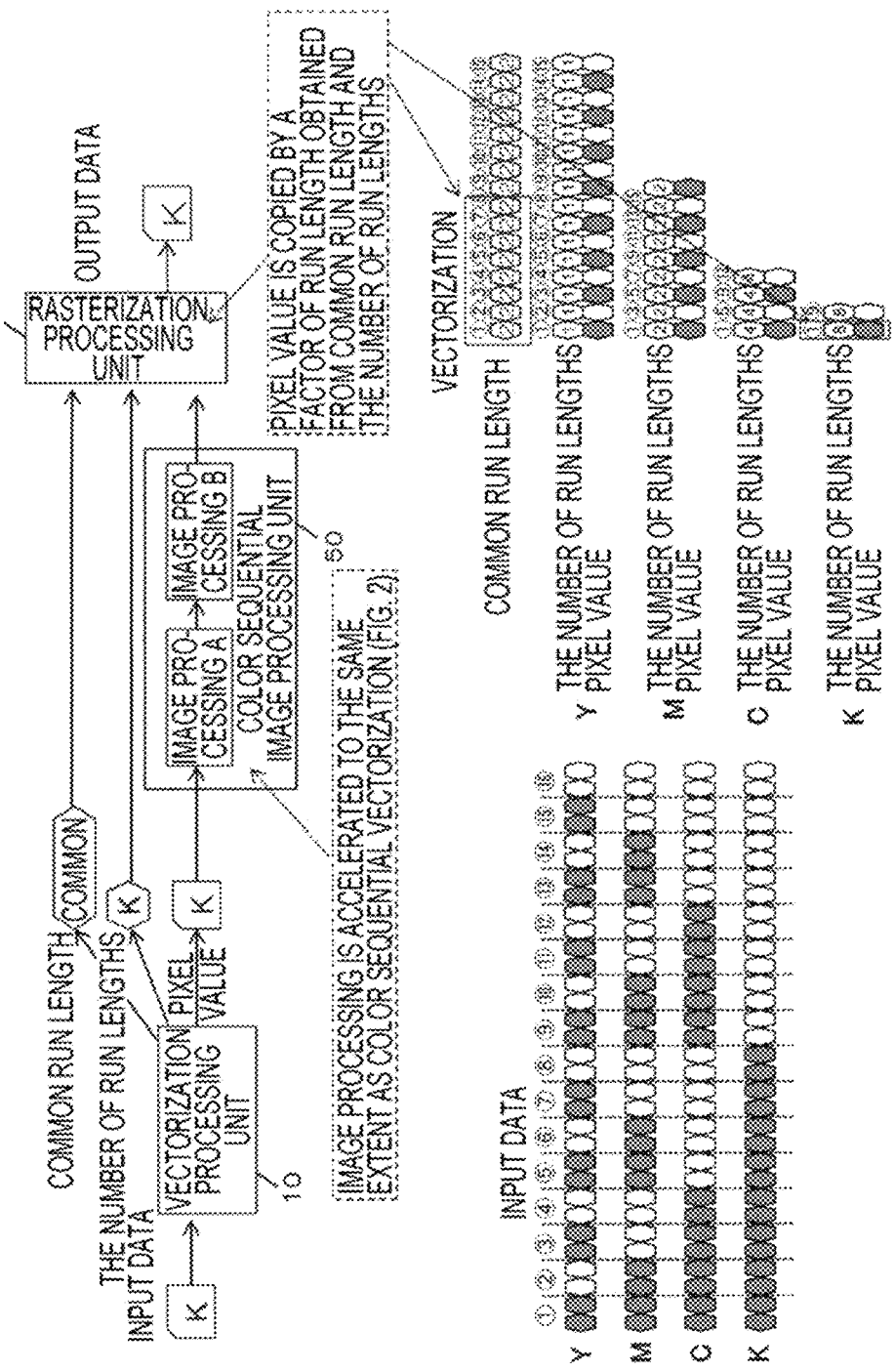
FIG. 7 is a view illustrating a specific example 1 of image processing by the image processing apparatus of FIG. 1.

FIG. 7 is a view illustrating a specific example 1 of image processing by the image processing apparatus 100 of FIG. 1. In the specific example 1 of FIG. 7, only color sequential image processing is executed as image processing on four input data (data strings) corresponding respectively to the four color components of YMCK.

First, the vectorization processing unit 10 encodes each input data (each data string) of YMCK into a vector format based on a combination of a pixel value and the number of run lengths by using the number of run lengths which is the number of common run lengths (see FIG. 5).

Next, the color sequential image processing unit 50 executes the color sequential image processing on each input data (each data string) vectorized by the vectorization processing unit 10. The color sequential image processing, for example, maintains the number of run lengths of each input data as it is, and changes only the pixel values according to the processing contents.

Then, each input data (each data string) subjected to the color sequential image processing is decoded into a raster format by the rasterization processing unit 60. The rasterization processing unit 60 expands each input data which is subjected to the color sequential image processing, that is, each pixel value in the data strings in the vector format, by a factor of the run length obtained from the common run length and the number of run lengths of each pixel value, to thereby decode the vector-formatted data strings into a raster format and output the decoded data strings as output data.

For example, in the specific example of FIG. 7, when the data string of the K component, which is subjected to the color sequential image processing, is in a vector format based on a pixel value and the number of run lengths of 8, the rasterization processing unit 60 obtains the run length of 16 (=2×8) from the common run length of 2 and the number of run lengths of 8 and expands (copies) a pixel value of the K component in the vector format by a factor of 16 (a factor of the run length) to thereby decode the pixel value into a data string in a raster format having 16 consecutive identical pixel values. When the common run length is changed, a run length is calculated by adding a value obtained by multiplying the changed common run lengths by the number of run lengths (see FIG. 6).

In FIG. 7, only the processing for the data string of the K component is illustrated as a representative example. However, the vectorization process by the vectorization processing unit 10, the color sequential image processing by the color sequential image processing unit 50 and the rasterization processing by the rasterization processing unit 60 are also executed for each data string (each input data) of YMC. In the specific example of FIG. 7, the common run length and the number of run lengths are transferred from the vectorization processing unit 10 to the rasterization processing unit 60.

According to the specific example 1 of FIG. 7, since the number of data (the number of pixel values) processed by the color sequential image processing unit 50 is the same as in the case of the color sequential vectorization in the specific example of FIG. 2, the image processing speeds up to the same extent as in the case of the color sequential vectorization.

Figure 8:
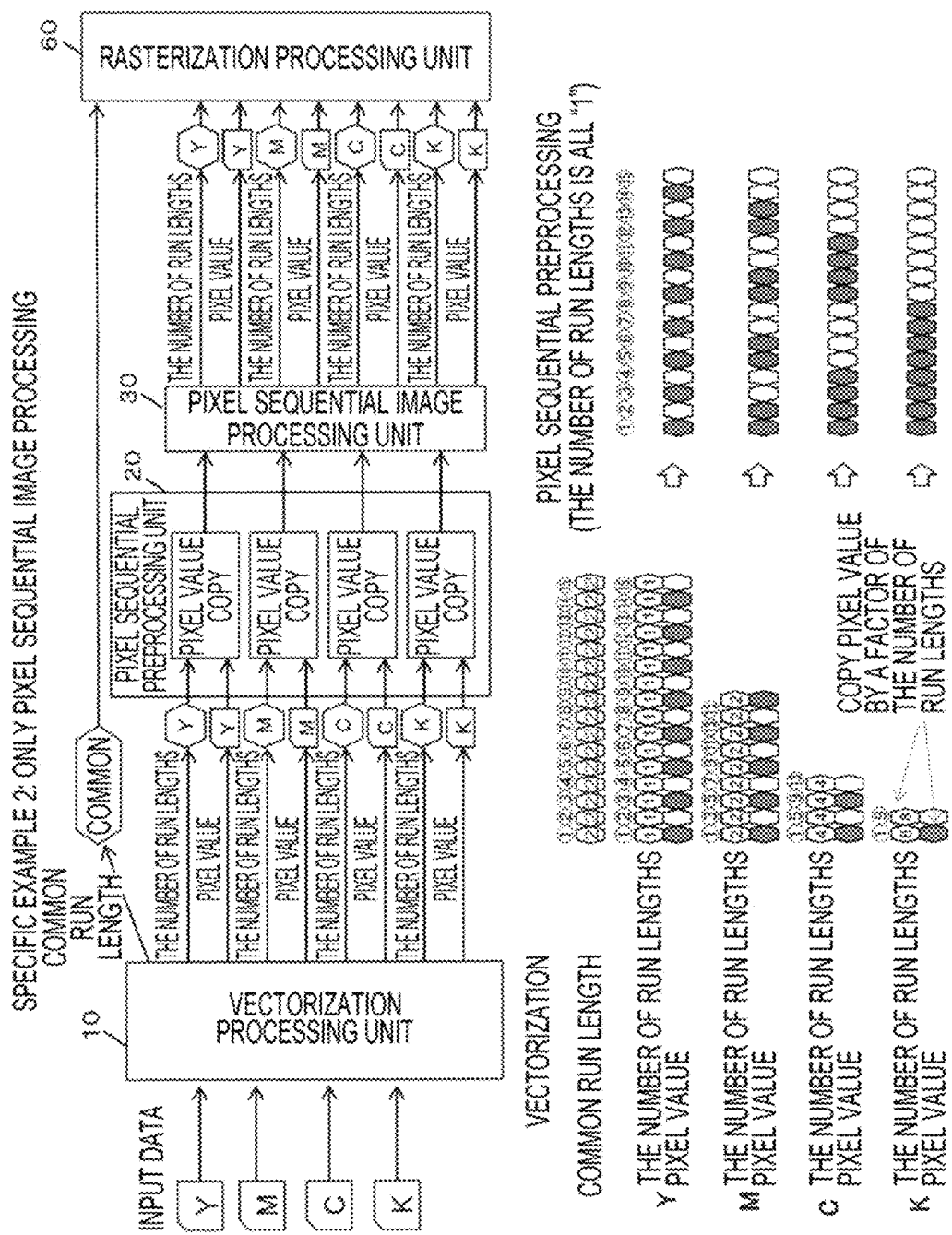
FIG. 8 is a view illustrating a specific example 2 of image processing by the image processing apparatus of FIG. 1.

FIG. 8 is a view illustrating a specific example 2 of image processing by the image processing apparatus 100 of FIG. 1. In the specific example 2 of FIG. 8, only the pixel sequential image processing is executed as image processing on four input data (data strings) corresponding respectively to the four color components of YMCK.

First, the vectorization processing unit 10 encodes each input data (each data string) of YMCK into a vector format based on a combination of a pixel value and the number of run lengths by using the number of run lengths which is the number of common run lengths (see FIG. 5).

Next, the pixel sequential preprocessing unit 20 executes the pixel sequential preprocessing. The pixel sequential preprocessing unit 20 executes preprocessing to obtain each data string for pixel sequential image processing by expanding each pixel value in the input data (the data strings) vectorized by the vectorization processing unit 10 by a factor of the number of run lengths of each pixel value. For example, in the specific example of FIG. 8, when the vectorized data string of the K component is in a vector format based on a pixel value and the number of run lengths of 8, the pixel sequential preprocessing unit 20 expands (copies) each pixel value of the K component by a factor of 8 (a factor of the number of run lengths) to obtain a data string having eight consecutive identical pixel values.

Thus, by the pixel sequential preprocessing, each data string in which the number of run lengths of all the pixel values is 1 while maintaining the common run length of the vector format is formed. That is, by the pixel sequential preprocessing of FIG. 8, like the pixel sequential vectorization of FIG. 3, the data length (the number of pixel values) of the four input data (data strings) of YMCK is arranged.

Next, the pixel sequential image processing unit 30 executes the pixel sequential image processing on each input data (each data string) subjected to the pixel sequential preprocessing. By the pixel sequential image processing, for example, the number of run lengths of each input data is maintained at 1 and only the pixel value is changed according to the processing contents.

Then, each input data (each data string) subjected to the pixel sequential image processing is decoded into a raster format by the rasterization processing unit 60. The rasterization processing unit 60 expands each pixel value in the input data (in the data strings) subjected to the pixel sequential image processing by a factor of the run length obtained from the common run length and the number of run lengths of each pixel value to thereby decode the data strings, which are in the vector format, into the raster format and output the decoded data strings as output data.

In the specific example of FIG. 8, since the number of run lengths of all the pixel values is 1 in the four data strings corresponding respectively to the four color components subjected to the pixel sequential image processing, the run length of the pixel values in the decoding by the rasterization processing unit 60 is equal to the common run length. Therefore, in the specific example of FIG. 8, in the data transfer from the pixel sequential preprocessing unit 20 to the pixel sequential image processing unit 30 and the data transfer from the pixel sequential image processing unit 30 to the rasterization processing unit 60, only the pixel values of each data string may be transferred and the transfer of the number of run lengths may be omitted. Further, the common run length is transferred from the vectorization processing unit 10 to the rasterization processing unit 60, for example.

According to the specific example 2 of FIG. 8, the pixel sequential image processing becomes possible by adding the pixel sequential preprocessing unit 20, which can be implemented with a relatively simple circuit configuration, to the preceding stage of the pixel sequential image processing unit 30.

Figure 9:
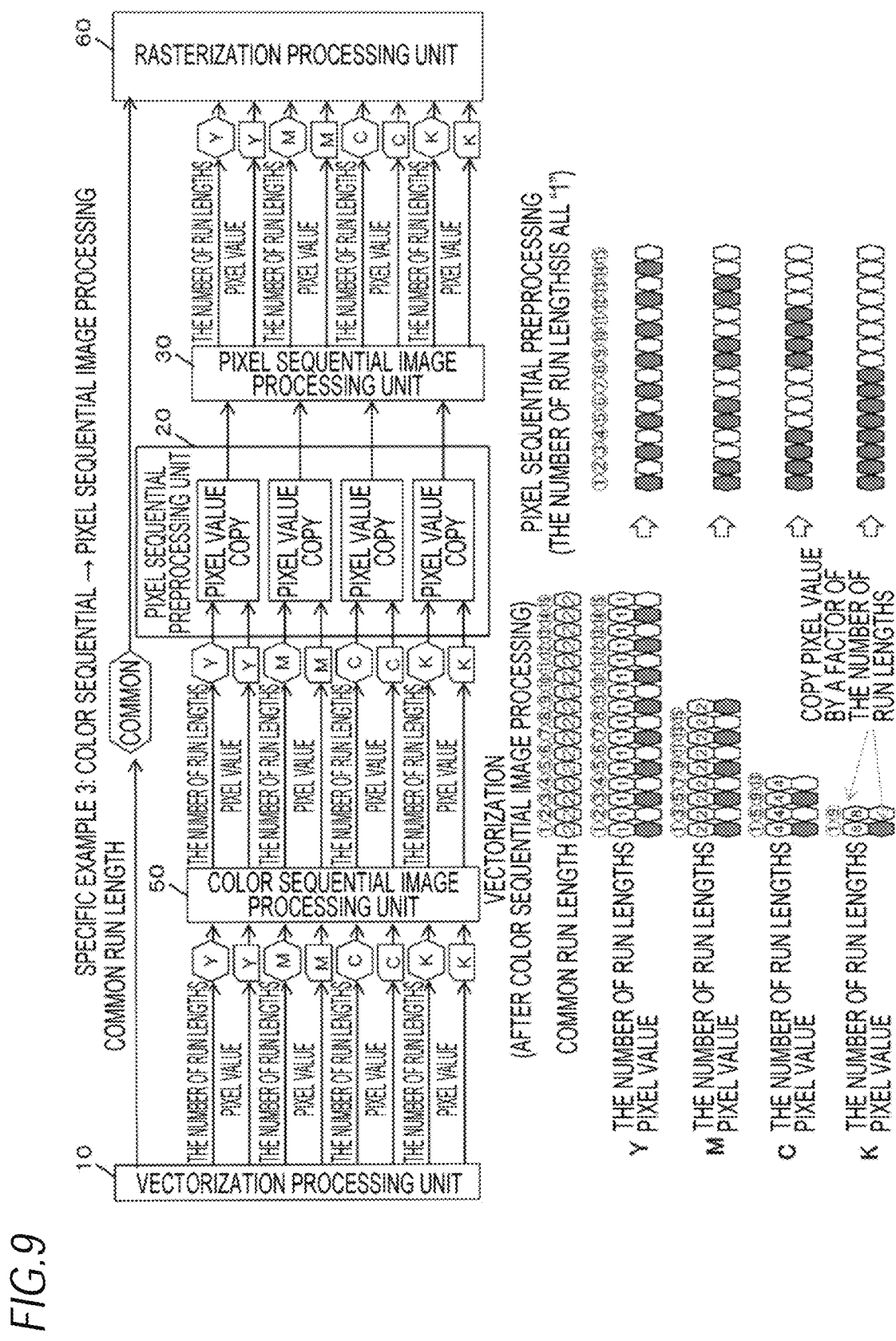
FIG. 9 is a view illustrating a specific example 3 of image processing by the image processing apparatus of FIG. 1.

FIG. 9 is a view illustrating a specific example 3 of image processing by the image processing apparatus 100 of FIG. 1. The specific example 3 of FIG. 9 executes the pixel sequential image processing for the four input data (data strings) corresponding respectively to the four color components of YMCK, as image processing, after execution of the color sequential image processing.

First, the vectorization processing unit 10 encodes each input data (each data string) of YMCK into a vector format based on a combination of a pixel value and the number of run lengths by using the number of run lengths which is the number of common run lengths (see FIG. 5).

Next, the color sequential image processing unit 50 executes the color sequential image processing on each input data (each data string) vectorized by the vectorization processing unit 10. The color sequential image processing, for example, maintains the number of run lengths of each input data as it is, and changes only the pixel values according to the processing contents.

Then, the pixel sequential preprocessing unit 20 executes the pixel sequential preprocessing for each input data (each data string) subjected to the color sequential image processing. The pixel sequential preprocessing unit 20 executes preprocessing of expanding each pixel value in the vectorized input data (data strings) subjected to the color sequential image processing, by a factor of the number of run lengths of each pixel value and thereby obtaining the data strings for pixel sequential image processing. For example, in the specific example of FIG. 9, in a case where the vectorized data string of the K component subjected to the color sequential image processing is in a vector format based on a pixel value and the number of run lengths of 8, the pixel sequential preprocessing unit 20 expands (copies) a pixel value of the K component by a factor of 8 (a factor of the number of run lengths) to thereby obtain a data string having 8 consecutive identical pixel values.

Thus, by the pixel sequential preprocessing, each data string in which the number of run lengths of all the pixel values is 1 while maintaining the common run length of the vector format is formed. That is, by the pixel sequential preprocessing of FIG. 9, like the pixel sequential vectorization of FIG. 3, the data length (the number of pixel values) of the four input data (data strings) of YMCK is arranged.

Then, as in the specific example 2 illustrated in FIG. 8, also in the specific example 3 illustrated in FIG. 9, the pixel sequential image processing unit 30 executes the pixel sequential image processing on each input data (each data string) subjected to the pixel sequential preprocessing, and the rasterization processing unit 60 decodes each input data subjected to the pixel sequential image processing into a raster format.

In addition, in the specific example 3 of FIG. 9, in the data transfer from the pixel sequential preprocessing unit 20 to the pixel sequential image processing unit 30 and the data transfer from the pixel sequential image processing unit 30 to the rasterization processing unit 60, only the pixel values of each data string may be transferred and the transfer of the number of run lengths may be omitted. Further, the common run length is transferred from the vectorization processing unit 10 to the rasterization processing unit 60, for example.

According to the specific example 3 of FIG. 9, the color sequential image processing is accelerated to the same extent as the color sequential vectorization and the pixel sequential image processing may be executed by adding a relatively simple circuit (the pixel sequential preprocessing unit 20).

Figure 10:
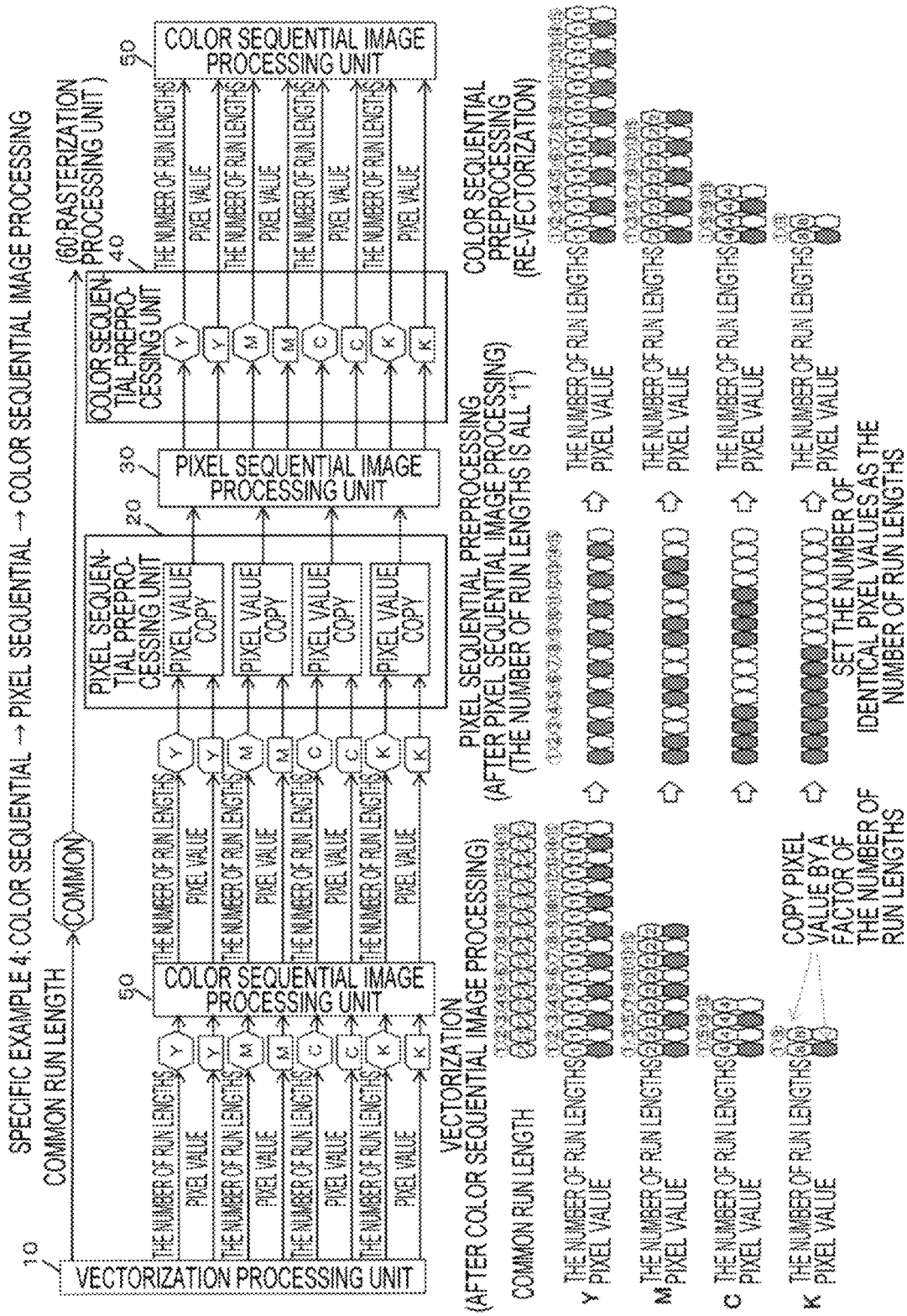
FIG. 10 is a view illustrating a specific example 4 of image processing by the image processing apparatus of FIG. 1.

FIG. 10 is a view illustrating a specific example 4 of image processing by the image processing apparatus 100 in FIG. 1. The specific example 4 illustrated in FIG. 10 executes the pixel sequential image processing for the four input data (data strings) corresponding respectively to the four color components of YMCK, as image processing, after execution of the color sequential image processing, and executes the color sequential image processing after execution of the pixel sequential image processing.

The processing from the vectorization processing unit 10 to the pixel sequential image processing unit 30 in the specific example 4 of FIG. 10 is the same as the processing from the vectorization processing unit 10 to the pixel sequential image processing unit 30 in the specific example 3 of FIG. 9.

That is, also in the specific example 4 of FIG. 10, first, the vectorization processing unit 10 encodes each input data (each data string) of YMCK into a vector format based on a combination of a pixel value and the number of run lengths by using the number of run lengths which is the number of common run lengths (see FIG. 5). Thereafter, the color sequential image processing by the color sequential image processing unit 50, the pixel sequential preprocessing by the pixel sequential preprocessing unit 20 and the pixel sequential image processing by the pixel sequential image processing unit 30 are executed in order.

In the specific example 4 illustrated in FIG. 10, the color sequential preprocessing unit 40 executes the color sequential preprocessing for each input data subjected to the pixel sequential image processing. The color sequential preprocessing unit 40 re-vectorizes each input data (each data sequence) for pixel sequential image processing into a vector format based on a combination of a pixel value and the number of run lengths and then executes preprocessing to obtain each data string for color sequential image processing.

For example, in the specific example of FIG. 10, since the Y component subjected to the pixel sequential image processing is a data string in which identical pixel values are arranged one by one, the Y component is re-vectorized into a vector format based on a combination of a pixel value and the number of run lengths of 1. Since the M component subjected to the pixel sequential image processing is a data string in which each identical pixel value occurs in two consecutive data elements, the M component is re-vectorized into a vector format based on a combination of a pixel value and the number of run lengths of 2. Since the C component subjected to the pixel sequential image processing is a data string in which each identical pixel value occurs in four consecutive data elements, the C component is re-vectorized into a vector format based on a combination of a pixel value and the number of run lengths of 4. Since the K component subjected to the pixel sequential image processing is a data string in which each identical pixel value occurs in eight consecutive data elements, the K component is re-vectorized into a vector format based on a combination of a pixel value and the number of run lengths of 8.

Then, the color sequential image processing unit 50 executes the color sequential image processing on each re-vectorized input data (each data string). The color sequential image processing, for example, maintains the number of run lengths of each input data as it is, and changes only the pixel values according to the processing contents. Thereafter, each input data (each data string) subjected to the color sequential image processing is decoded into a raster format by the rasterization processing unit 60.

In addition, in the specific example 4 of FIG. 10, in the data transfer from the pixel sequential preprocessing unit 20 to the pixel sequential image processing unit 30 and the data transfer from the pixel sequential image processing unit 30 to the color sequential preprocessing unit 40, only the pixel values of each data string may be transferred and the transfer of the number of run lengths may be omitted. Further, the common run length is transferred from the vectorization processing unit 10 to the rasterization processing unit 60, for example.

According to the specific example 4 of FIG. 10, the color sequential image processing is accelerated to the same extent as the color sequential vectorization and image processing in which the pixel sequential image processing and the color sequential image process coexist in an alternating manner may be executed by adding a relatively simple circuit (the pixel sequential preprocessing unit 20 and the color sequential preprocessing unit 40).

While the exemplary embodiments of the present invention have been described above, the disclosed embodiments are merely illustrative in all respects and do not limit the scope of the present invention. The present invention encompasses various modifications without departing from the spirit and scope of the invention.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
   an input device configured to receive image data of an image in a pixelated format configured as a plurality of data strings, each data string representing a different color component; and
   a hardware processor or hardware circuit configured to implement:
      an image processing block configured to determine a number of common run lengths which are common to the plurality of data strings as run information of identical pixel values which are consecutive in each of the plurality of data strings, and transform each of the plurality of data stings to form output image data based on the number of common run lengths,
   wherein the common run length is the consecutive number of identical pixel values which are consecutive in each of the plurality of data strings, the consecutive numbers being defined so that the consecutive numbers in the plurality of data strings are equal to each other; and
   wherein the common length changes with each newly received image data string.

2. The image processing apparatus according to claim 1, wherein
   the image processing block comprises a vectorization processing unit configured to encode each of the plurality of data strings into a vector format based on a combination of a pixel value and the number of run lengths by using the number of run lengths, which is the number of common run lengths.

3. The image processing apparatus according to claim 2, wherein
   the image processing block comprises a rasterization processing unit configured to decode the data strings, which are in the vector format, into a raster format by expanding each pixel value in the data strings, which are in the vector format, by a factor of a run length obtained from the common run length and the number of run lengths of each pixel value.

4. The image processing apparatus according to claim 2, wherein
   the image processing block comprises a pixel sequential preprocessing unit configured to obtain data strings for pixel sequential image processing by expanding each pixel value in the data strings, which are in the vector format, by a factor of the number of run lengths of each pixel value.

5. The image processing apparatus according to claim 3, wherein
   the image processing block comprises a pixel sequential preprocessing unit configured to obtain data strings for pixel sequential image processing by expanding each pixel value in the data strings, which are in the vector format, by a factor of the number of run lengths of each pixel value.

6. The image processing apparatus according to claim 4, wherein
   the image processing block comprises a color sequential preprocessing unit configured to obtain a data string for color sequential image processing by re-vectorizing each data string for the pixel sequential image processing into a vector format based on a combination of a pixel value and the number of run lengths.

7. The image processing apparatus according to claim 5, wherein
   the image processing block comprises a color sequential preprocessing unit configured to obtain a data string for color sequential image processing by re-vectorizing each data string for the pixel sequential image processing into a vector format based on a combination of a pixel value and the number of run lengths.

8. A non-transitory computer readable storage medium storing a program causing a computer to execute image processing, the image processing comprising:
   receiving image data of an image in a pixelated format configured as a plurality of data strings, each data string representing a different color component; and
   determine the number of common run lengths which are common to the plurality of data strings as run information of identical pixel values which are consecutive in each of the plurality of data strings
   transform each of a plurality of data strings by using the number of common run lengths to form output data,
   wherein the common run length is the consecutive number of identical pixel values which are consecutive in each of the plurality of data strings, the consecutive numbers being defined so that the consecutive numbers in the plurality of data strings are equal to each other; and
   wherein the common length changes with each newly received image data string.

9. An image processing method comprising:
   receiving image data of an image in a pixelated format configured as a plurality of data strings, each data string representing a different color component; and
   determine the number of common run lengths which are common to the plurality of data strings as run information of identical pixel values which are consecutive in each of the plurality of data strings
   transform each of a plurality of data strings by using the number of common run lengths to form output data,
   wherein the common run length is the consecutive number of identical pixel values which are consecutive in each of the plurality of data strings, the consecutive numbers being defined so that the consecutive numbers in the plurality of data strings are equal to each other; and wherein the common length changes with each newly received image data string.

* * * * *